United States Patent
Shin

(10) Patent No.: US 7,602,315 B2
(45) Date of Patent: Oct. 13, 2009

(54) NAVIGATION APPARATUS HAVING A PICTURE FRAME FUNCTION AND METHOD FOR OPERATING THE SAME

(75) Inventor: Yong Myung Shin, Seoul (KR)

(73) Assignee: SK C&C Co., Ltd., Seoul (KR)

( * ) Notice: Subject to any disclaimer, the term of this patent is extended or adjusted under 35 U.S.C. 154(b) by 268 days.

(21) Appl. No.: 11/812,408

(22) Filed: Jun. 19, 2007

(65) Prior Publication Data

US 2008/0238724 A1 Oct. 2, 2008

(30) Foreign Application Priority Data

Mar. 29, 2007 (KR) ...................... 10-2007-0030790

(51) Int. Cl.
G08G 1/123 (2006.01)
G01C 21/30 (2006.01)
G01C 21/32 (2006.01)
G01C 21/00 (2006.01)

(52) U.S. Cl. .............................. 340/995.27; 340/995.1; 340/995.14; 340/995.19; 340/995.24; 340/995.28; 340/990; 701/23; 701/24; 701/25; 701/26; 701/28; 701/211; 701/212; 701/213

(58) Field of Classification Search ................. 340/990, 340/995.1, 995.14, 995.19, 995.24, 995.26, 340/995.28; 701/23–28, 211–213
See application file for complete search history.

(56) References Cited

U.S. PATENT DOCUMENTS 5,764,139 A * 6/1998 Nojima et al. .............. 340/461
6,157,297 A * 12/2000 Nakai ........................ 340/461
6,624,749 B1 * 9/2003 Winterkorn ................. 340/461
7,272,497 B2 * 9/2007 Koshiji et al. ............... 701/211
2006/0012715 A1 1/2006 Abe
2006/0066762 A1 * 3/2006 Suwa et al. ................. 348/837

FOREIGN PATENT DOCUMENTS

| JP | 2004-333546 | 11/2004 |
| JP | 2005-99403 | 4/2005 |
| JP | 2005-167917 | 6/2005 |
| JP | 2006-33210 | 2/2006 |
| KR | 10-0506613 | 7/2005 |

* cited by examiner

*Primary Examiner*—Benjamin C Lee
*Assistant Examiner*—Lam P Pham
(74) *Attorney, Agent, or Firm*—Bacon & Thomnas, PLLC

(57) ABSTRACT

A navigation apparatus includes a map data storage for storing a map data, a picture frame image storage for storing one or more images, a mode-based setting storage for storing mode-based settings required in operating the navigation apparatus in a drive guide mode, a picture frame mode or a combination mode, and a control unit for, based on the mode-based settings, providing a drive guide information using the map data in the drive guide mode, providing drive guide information by use of the map data in the drive guide mode, providing a picture frame image by using the images in the picture frame mode and providing the picture frame image and the drive guide information in the combination mode, the drive guide information being displayed over the picture frame image.

15 Claims, 5 Drawing Sheets

NAVIGATION APPARATUS HAVING A PICTURE FRAME FUNCTION AND METHOD FOR OPERATING THE SAME

FIELD OF THE INVENTION

The present invention relates to a navigation apparatus and, more particularly, to a navigation apparatus having a picture frame function by which a background image is displayed on a screen which displays drive guide information and a method for operating the same.

BACKGROUND OF THE INVENTION

As widely known in the art, a navigation apparatus is designed to calculate a current position of a vehicle using position information and indicate the current position in a map displayed on a display screen.

Furthermore, the navigation apparatus serves to provide a driver with various kinds of information required in driving, such as a moving direction of a vehicle, a distance to a destination, a current moving speed of a vehicle, a route set by a driver prior to driving and an optimum route leading to a destination.

Nowadays, such navigation apparatuses are mounted on a variety of vehicles and the like, including a ship, an airplane and a motor vehicle, and are extensively used to extract a current position and a moving speed or to determine a moving route thereof.

In particular, the navigation apparatus is adapted to calculate the current position of the corresponding vehicle by receiving radio waves indicative of a latitude, a longitude, an altitude and the like from a plurality of artificial satellites belonging to a GPS (Global Positioning System) and, then, visually display or aurally notify a driver of map information including the current position.

A navigation apparatus mounted on a motor vehicle travelling on a road provides, either visually or aurally, various kinds of information such as the name of the current traveling road, a current vehicle position, a driving route and a level of traffic congestion.

The navigation apparatus for a motor vehicle determines the current vehicle position by receiving radio waves from different GPS satellites and calculating the time difference for the signals to reach the motor vehicle. Then, the navigation apparatus retrieves map data for the relevant area from a database and displays on a display screen thus determined current vehicle position together with map information.

In addition, the navigation apparatus for a motor vehicle calculates a driving distance and a moving azimuth angle using a driving information detector such as a velocity sensor and a gyro sensor and displays on the display screen a driving route extending from a start point to the current vehicle position.

Korean Patent Publication No. 10-0506613B1 discloses a drive guide apparatus for a motor vehicle having a function of picture frame and a method for operating the same.

If a driver selects a picture frame and a photo according to his or her preference, the drive guide apparatus displays a picture frame image with the photo set into the picture frame on a display screen, thus improving a vehicle interior. In case an unexpected situation occurs during the vehicle driving, the drive guide apparatus converts the screen of the picture frame image to a screen of a drive guide image, displaying the drive guide image on the display screen.

However, the drive guide apparatus noted above does nothing but to employ a function of the picture frame in a navigation apparatus. In other words, depending on the user's selection, either of the picture frame image or the drive guide image is merely displayed on the display screen.

Moreover, although the drive guide apparatus is configured to automatically convert the picture frame image to the drive guide image when there is an unexpected driving condition or situation, the criteria for determining the occurrence of an unexpected driving condition or situation are ambiguous. In order to assure an accurate conversion, there is a need for a sophisticatedly designed road/driving condition detector capable of determining the unexpected occurrences. However, this could be costly and undermine the advantages offered by the picture frame function, thereby restricting commercialization and popularization of the apparatus.

More importantly, the key role of a navigation apparatus is to continuously provide drive guide information when driving motor vehicle and to enable a driver to cope with various kinds of unexpected situations in advance, thus assuring safe vehicle driving. Accordingly, it would be useless to provide the drive guide information after unexpected situations have already occurred.

Furthermore, a user ought to select either the picture frame image or the drive guide image, limiting that no drive guide information is available when the picture frame image is displayed. Even if the drive guide image is selected while the picture frame image is displayed on the display screen, a time delay is present when converting the picture frame mode to the drive guide mode and loading map data. This poses a problem in that it is impossible to rapidly and timely provide a user with drive guide information.

SUMMARY OF THE INVENTION

It is, therefore, an object of the present invention to provide a navigation apparatus and an operation method for providing a picture frame image as a background image on a screen for displaying drive guide information, thereby enabling a user to acquire drive guide information while enjoying seeing a picture frame image.

Another object of the present invention is to provide a navigation apparatus and an operation method thereof for providing a picture frame image as a background image of a drive guide image during execution of a drive guide mode in accordance with a user selection.

A further object of the present invention is to provide a navigation apparatus and an operation method thereof for providing a guide image over a picture frame image during execution of a picture frame mode in accordance with a user selection.

In accordance with an aspect of the present invention, there is provided a navigation apparatus including: an input unit for allowing a user to select one of a drive guide mode for realization of a drive guide function, a picture frame mode for realization of a picture frame function and a combination mode for simultaneous realization of the guide function and the picture frame function; a map data storage for storing a map data for use in the drive guide mode; a picture frame image storage for storing one or more images; a mode-based setting storage for storing mode-based settings required in operating the navigation apparatus in the drive guide mode, the picture frame mode or the combination mode; and a control unit for, based on the mode-based settings stored through the input unit, providing drive guide information by use of the map data in the drive guide mode, providing a picture frame image by use of the images in the picture frame mode and providing the picture frame image and the drive guide information in the combination mode, the drive guide information being displayed over the picture frame image.

In accordance with another aspect of the present invention, there is provided a navigation apparatus operating method, comprising the steps of: (a) selecting one mode among a drive guide mode for realization of drive guide function, a picture frame mode for realization of a picture frame function and a combination mode for simultaneous realization of the drive guide mode and the picture frame mode; (b) confirming mode-based settings pre-stored to operate the navigation apparatus in the drive guide mode, the picture frame mode or the combination mode; and (c) based on the mode-based settings corresponding to the respective modes selected in the step (a), providing drive guide information by using the map data in the drive guide mode, providing a picture frame image by using the images in the picture frame mode and providing the picture frame image and the drive guide information in the combination mode, the drive guide information being indicated over the picture frame image.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings. While a navigation apparatus of the present invention is mountable to various kinds of vehicles such as a ship, an airplane and a motor vehicle, the following description will be focused on a navigation apparatus mounted on a motor vehicle running on a road, for the sake of illustration only.

Figure 1:
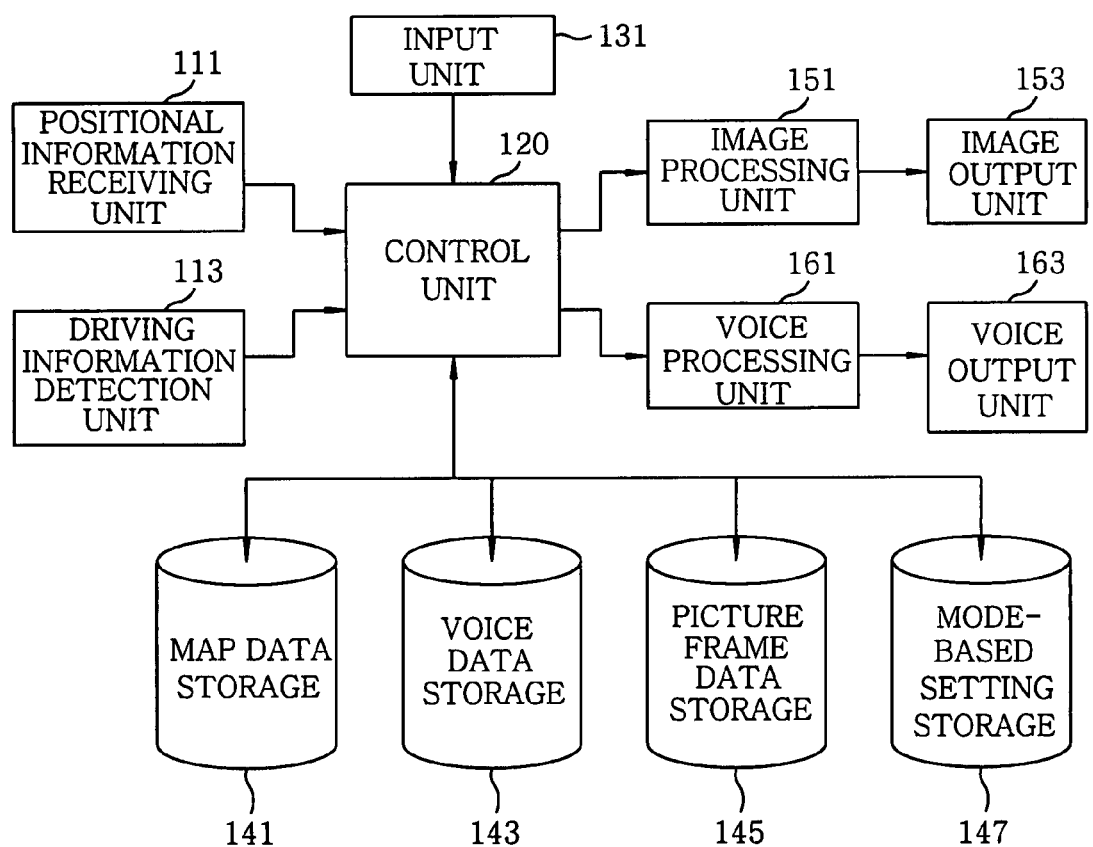
FIG. 1 is a block diagram showing a navigation apparatus in accordance with one embodiment of the present invention.

FIG. 1 is a block diagram showing a navigation apparatus in accordance with an embodiment of the present invention. As shown in FIG. 1, a navigation apparatus includes a positional information receiving unit 111, a driving information detection unit 113, a control unit 120, an input unit 131, a map data storage 141, a voice data storage 143, a picture frame image storage 145, a mode-based setting storage 147, an image processing unit 151, an image output unit 153, a voice processing unit 161, and a voice output unit 163.

The positional information receiving unit 111 receives positional information through an antenna (not shown) from a plurality of artificial satellites or base stations belonging to a GPS and then supplies the positional information to the control unit 120.

The driving information detection unit 113 detects an azimuth angle and velocity of a motor vehicle using a gyro sensor and a speed sensor and then supplies signals indicative of thus detected azimuth angle and velocity to the control unit 120.

The input unit 131 serves as an input interface for enabling a user to select one of operation modes of the present navigation apparatus including a drive guide mode, a picture frame mode and a combination mode and for allowing the user to input a destination or the like for reception of drive guide.

The drive guide mode is a mode to select a drive guide function for providing drive guide information, the picture frame mode being a mode to select a picture frame function for providing a picture frame image and the combination mode being a mode in which the drive guide function and the picture frame function are provided together.

The picture frame image refers to an image displayed on a display screen with a photo, picture or image set into a picture frame. In this regard, although the picture frame function of the present invention may include selecting a picture frame as disclosed in Korean Patent Publication No. 10-0506613B1, it will be omitted for simplicity.

The map data storage 141 is a database that stores a map data compressed in a specified reduction scale and other additional data such as route information, crossroad information and traffic lane information.

The voice data storage 143 stores a voice data which is to be provided as the drive guide information together with the map data stored in the map data storage 141.

The picture frame image storage 145 stores a plurality of images including moving images to realize the picture frame function. Although not shown in the drawings, these images may be inputted via a separate input path or means, or may be stored through a communication network such as the Internet by means of a communication module or may be inputted in a state that the navigation apparatus is directly connected to an external device (e.g., a digital camera and a personal computer) through a data interface.

The mode-based setting storage 147 stores mode-based settings which are pre-selected by the user to execute the drive guide mode, the picture frame mode and the combination mode.

The map data storage 141, the voice data storage 143, the picture frame image storage 145 and the mode-based setting storage 147 may be embodied using a hard disk drive, a flash memory, a compact flash memory or the like.

The image processing unit 151 serves to process the drive guide information under the control of the control unit 120 into a display visual data so that the user can visually ascertain the drive guide information. In the combination mode, the image processing unit 151 additionally provides the drive guide information while displaying the picture frame image as a background image.

The image output unit 153 is embodied by a CRT (Cathode Ray Tube) or an LCD (Liquid Crystal Display) and is adapted to display the display image data processed by the image processing unit 151.

The voice processing unit 161 serves to process the drive guide information under the control of the control unit 120 into a voice data and then output the same through the voice output unit 163 such as a speaker (not shown) so that the user can aurally ascertain the drive guide information.

The control unit 120 controls the overall operations of the navigation apparatus by driving an operating program required for operating an overall system and various kinds of application programs. As an example, the control unit 120 calculates a current vehicle position based on the azimuth angle and velocity of the motor vehicle supplied from the driving information detection unit 113 and the position coordinates supplied from the positional information receiving unit 111. Further, the control unit 120 generates the drive guide information on a vehicle running direction such as a left turn or a right turn and a distance to a turning point.

Based on the drive guide information thus generated, the control unit 120 retrieves map data of a relevant area from the map data storage 141 and performs a control operation to ensure that the map data is visually displayed through the image output unit 153 and aurally outputted through the voice output unit 163.

Furthermore, the control unit 120 provides an image extracted from the picture frame image storage 145 in the picture frame mode as a background image on the screen which displays the drive guide information and also provides a picture frame image in many different ways according to the settings pre-selected by the user in the picture frame mode. Moreover, if the user selects the picture frame function during execution of the drive guide mode, the control unit 120 provides the picture frame image as a background image in the drive guide mode in accordance with the setting preset in the mode-based setting storage 147. In contrast, if the user selects the guide function during execution of the picture frame mode, the control unit 120 additionally provides the guide information on the picture frame image in accordance with the setting preset in the mode-based setting storage 147.

The navigation apparatus configured as above is mounted to vehicles, such as a motor vehicle or the like, as a separate device, and provides the user with an electronic map service and a convenience function such as the picture frame function. An operating method of the navigation apparatus will now be described with reference to FIGS. 1 to 4, with an emphasis placed on the steps of providing the picture frame function, one of important features of the present invention.

Figure 2:
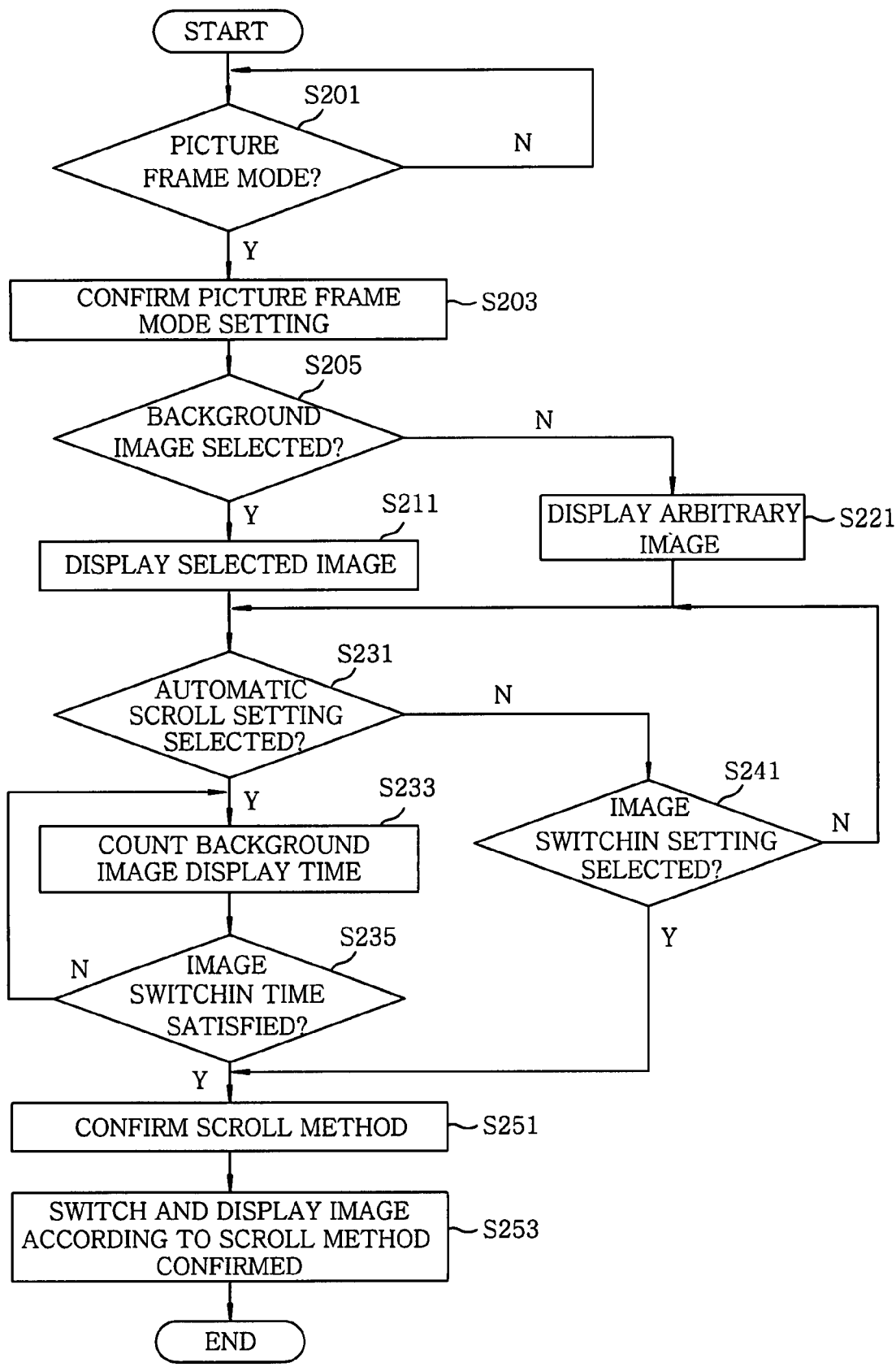
FIG. 2 is a flowchart illustrating an operating method of a picture frame mode selected in the navigation apparatus shown in FIG. 1.

FIG. 2 is a flowchart illustrating an operating method of a picture frame mode selected in the navigation apparatus shown in FIG. 1.

First, if the user selects the picture frame mode through the input unit 131 (step S201), the control unit 120 confirms the setting of a picture frame mode stored in the mode-based setting storage 147 (step S203). "The setting of a picture frame mode" herein refers to either a default or a setting selectively changed by the user and includes a background image setting, an automatic scroll setting, a image switching setting and the like.

For example, the automatic scroll setting designates one of the scroll methods, e.g., a horizontal scroll method by which a picture frame image is changed as if it moves in a horizontal direction and a vertical scroll method by which a picture frame image is changed as if it moves in a vertical direction. In addition, the image switching setting denotes switching between background images, e.g., for each fixed time period, and the fixed time period for switching may be set as a default, e.g., several seconds or several minutes or optionally changed by the user. In addition, the background image setting is to select one or more images to be used as a background image. In case that the background image is selected along with the image switching setting, one or more images selected in the background image setting will be sequentially switched in accordance with the image switching setting.

Next, the control unit 120 checks whether background image setting has been stored in the mode-based setting storage 147 (S205).

Thereafter, the control unit 120 extracts the background image from the picture frame image storage 145 according to the background image setting thus confirmed. The extracted background image is then provided to the image processing unit 151 and displayed through the image output unit 153 (step S211). However, in the step S205, if no background image setting is selected by the user, the latest used image or a default image is employed as the background image (step S221).

Next, whether the automatic scroll setting has been set in the mode-based setting storage 147 is checked (step S231). If "yes", the control unit 120 counts the display time of the background image being currently displayed (step S233) and determines whether the display time thus counted satisfies a time period for an image switching preset in the image switching setting (step S235).

If the display time is satisfied with the time period preset in the image switching setting, the control unit 120 checks whether the scroll setting, i.e., the horizontal scroll method or the vertical scroll method is selected or not (step S251).

After checking the selected scroll method, the control unit 120 extracts a next order image from the picture frame image storage 145 based on the background image setting stored in the mode-based setting storage 147.

Then, the control unit 120 provides the extracted image to the image processing unit 151 and allows the image to be displayed through the image output unit 153. That is, the image currently displayed is switched to the next order image while scrolling the images in accordance with the selected scroll method, i.e., the horizontal or vertical scroll method (step S253).

On the other hand, if it is confirmed that the automatic scroll setting has not been set in step S231, a control program goes to the step S241 where the control unit 120 executes step S251 and step S253 only when a user desires to change the image currently displayed to a next order image through the input unit 131 irrespective of the image switching setting (step S241).

Figure 3:
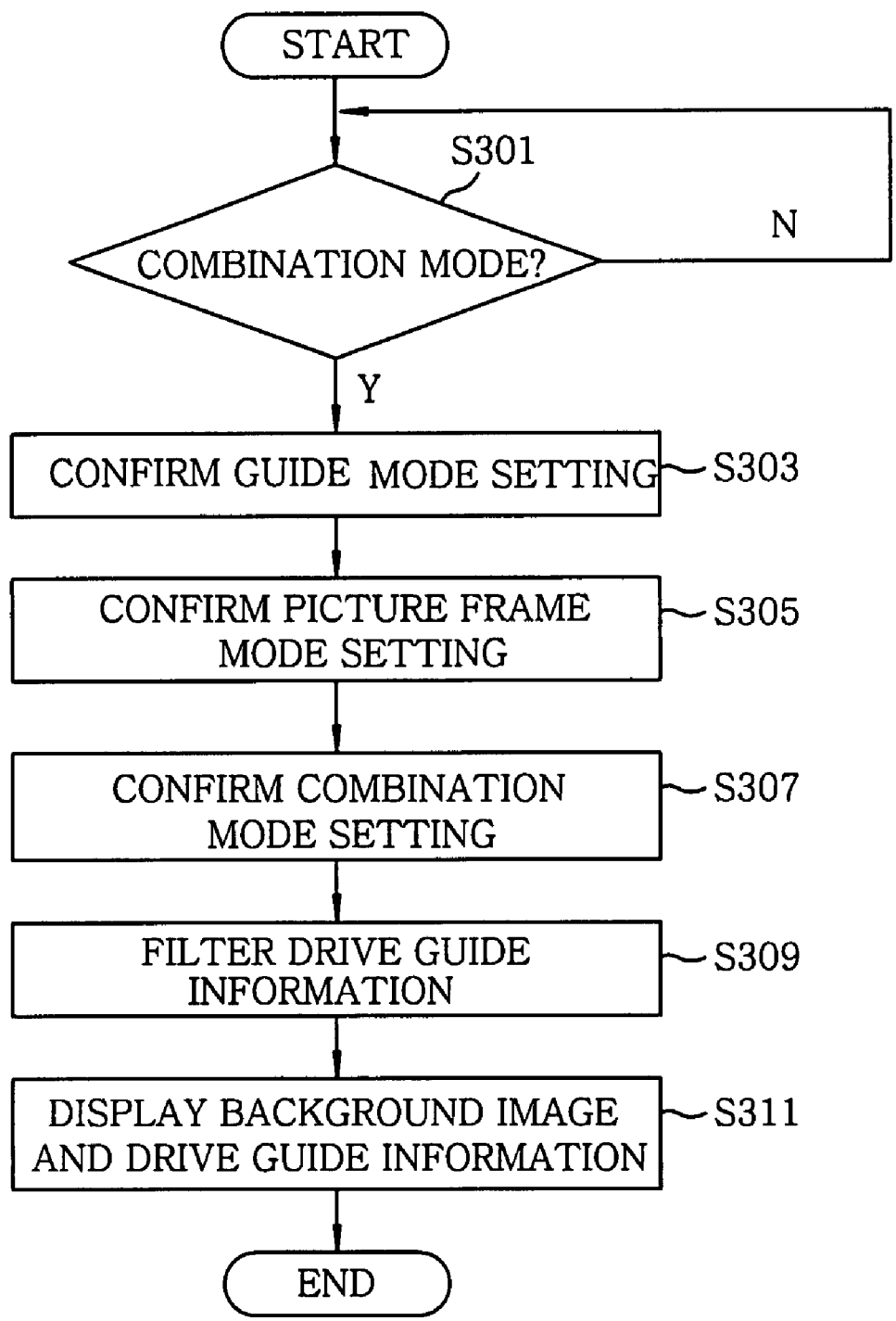
FIG. 3 is a flowchart illustrating an operating method of a combination mode selected in the navigation apparatus shown in FIG. 1.

FIG. 3 is a flowchart illustrating an operating method of a combination mode selected in the navigation apparatus shown in FIG. 1.

First, if the user selects the combination mode through the input unit 131 (step S301), the control unit 120 confirms the settings of a drive guide mode, a picture frame mode and a combination mode stored in the mode-based setting storage 147 (steps S303, S305 and S307). "Settings of a drive guide mode, a picture frame mode and a combination mode" herein refers to either a default or a setting optionally changed by the user.

As set forth above in FIG. 2, the setting of a picture frame mode includes a background image setting, an automatic scroll setting, an image switching setting and the like. The setting of a drive guide mode includes a destination required for receiving drive guide, a guide method setting on a shortest route and an optimum route, a vocal setting on voice guide and so forth. The setting of the combination mode is used to assure smooth signal processing and to eliminate restriction imposed by the size of the display screen, which task can be performed by limiting some functions of the drive guide mode or the picture frame mode and reducing a data processing amount at the time when a mixed service of the drive guide mode and the picture frame mode is served by the combination mode.

Next, based on the combination mode setting stored in the mode-based setting storage 147, the control unit 120 performs a filtering step (step S309) for selecting only a part of the drive guide information among the various kinds of drive guide information acquired in the drive guide mode. In other words, the information having relatively high importance among the drive guide information is selectively chosen and provided in the combination mode, despite that the entire drive guide information is provided in the drive guide mode.

Figure 5:
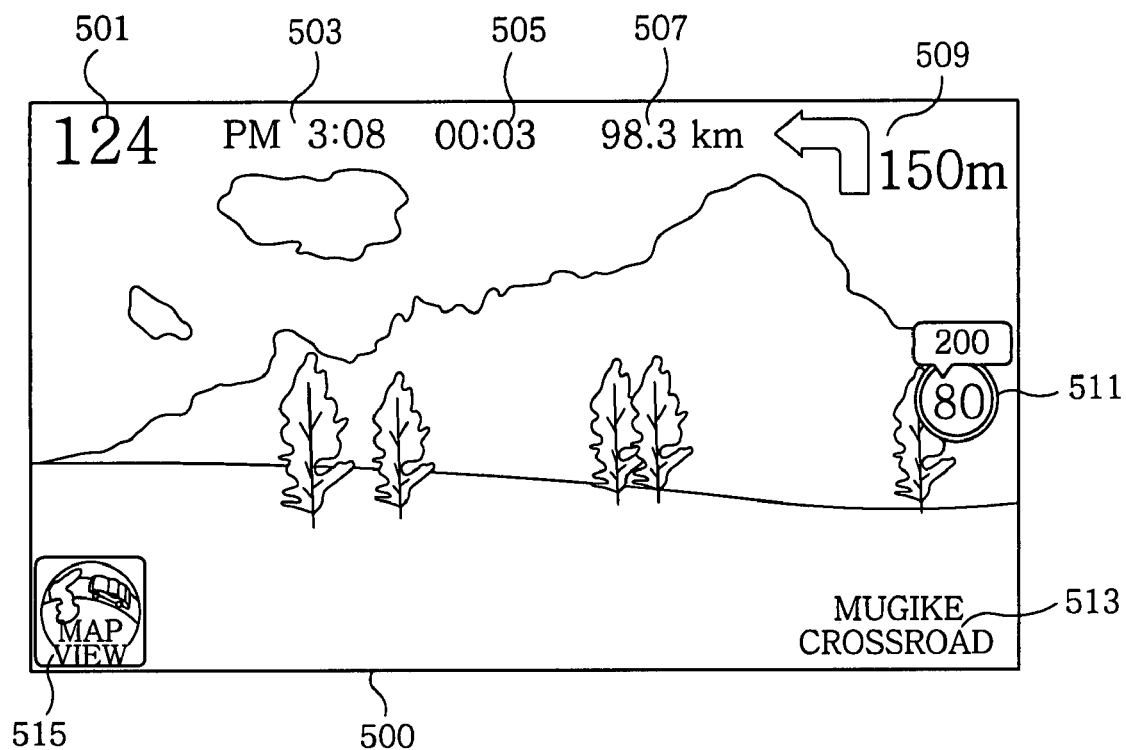
FIG. 5 is an exemplary view produced in a combination mode selected in the navigation apparatus shown in FIG. 1.

For example, referring to FIG. 5 which shows a screen provided in the combination mode, there is shown a screen 500 having some essential items served in the combination mode such as a current speed 501, a current time 503, a remaining time 505, a remaining distance 507, a turning direction and distance to a turning point 509, safety drive information 511 and a current vehicle position 513 indicated on a background image. FIG. 5 illustrates the essential drive guide information provided in the combination mode for simple illustration purpose. Reference numeral 515 designates an icon for conversion to the drive guide mode.

Further, the control unit 120 extracts an image from the picture frame image storage 145 based on the background image setting of the picture frame mode stored in the mode-based setting storage 147. The control unit 120 provides the extracted image to the image processing unit 151 and also provides the drive guide information extracted through the filtering in step S309 to the image processing unit 151.

Then, the image processing unit 151 provides the image extracted from the picture frame image storage 145 as the background image on the screen for displaying the drive guide information, while simultaneously displaying the drive guide information selected in step S309 over the background image (step S311).

Figure 4:
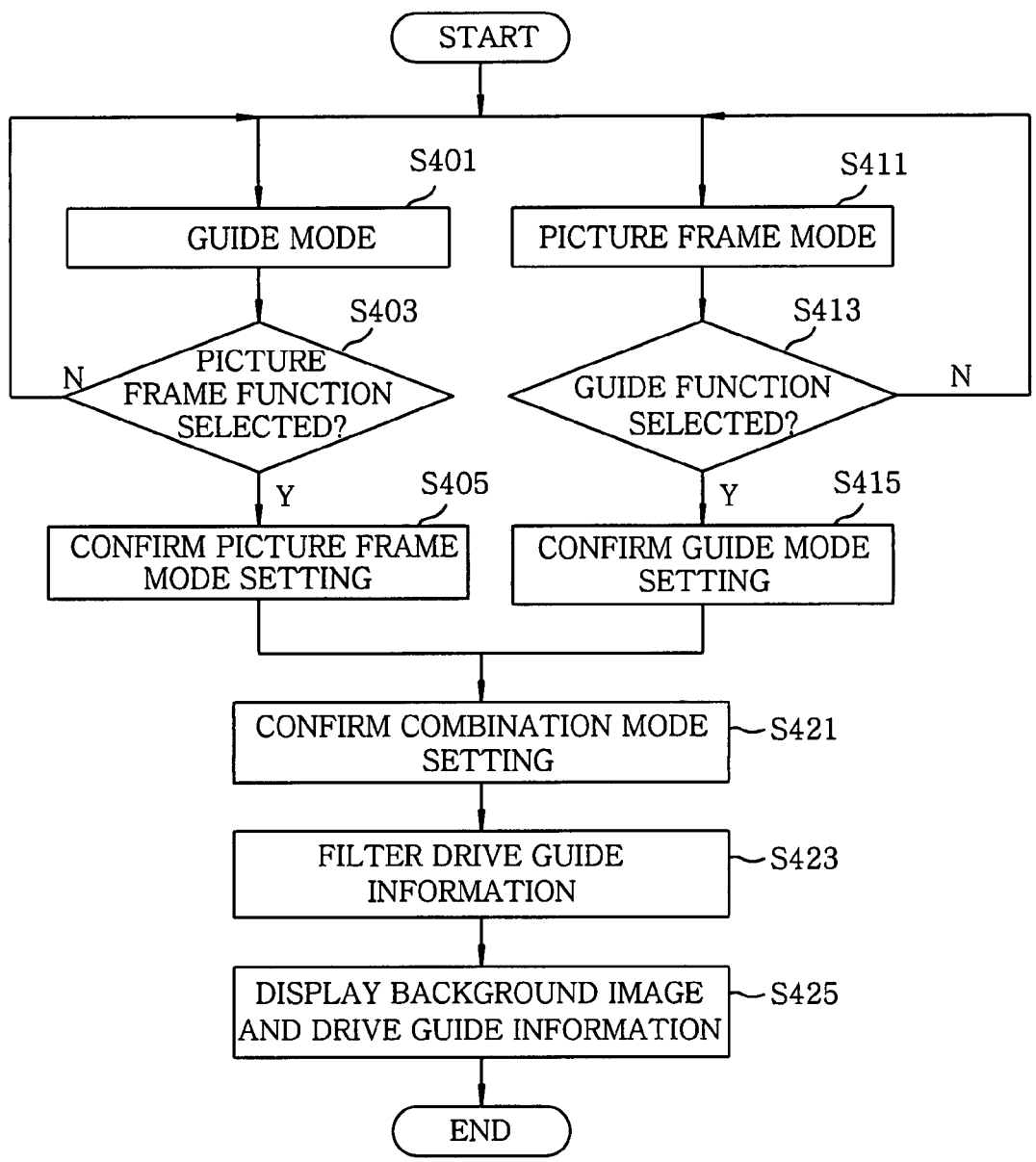
FIG. 4 is a flowchart illustrating an operating method of a picture frame function realized during execution of a drive guide mode and of a drive guide function realized when executing a picture frame mode selected in the navigation apparatus shown in FIG. 1.

FIG. 4 is a flowchart illustrating an operating method of a picture frame function realized during execution of a drive guide mode and of a guide function realized during execution of a picture frame mode in the navigation apparatus shown in FIG. 1. That is, this figure illustrates an instance where the picture frame function is selected through the input unit 131 during an operation in the drive guide mode and an instance where the guide function is selected through the input unit 131 during an operation in the picture frame mode.

First, while the drive guide information is displayed through the image output unit 153 in accordance with the drive guide mode (step S401), the control unit 120 checks whether the user selects the picture frame function which is operable in the picture frame mode or the combination mode through the input unit 131 (step S403).

If the selection of the picture frame function is checked, the control unit 120 confirms the setting of the picture frame mode stored in the mode-based setting storage 147 (step S405). In this connection, description will be omitted on the setting of the picture frame mode which has already been set forth above with reference to FIGS. 2 and 3.

In contrast, while the background image is displayed through the image output unit 153 in accordance with the picture frame mode (step S413), the control unit 120 checks whether the user selects the guide function which is operable in the combination mode or the drive guide mode through the input unit 131 (step S413).

If it is checked the selection of the drive guide function, the control unit 120 confirms the setting of the drive guide mode stored in the mode-based setting storage 147 (step S415). In this regard, description will be omitted on the setting of the drive guide mode which has been already set forth above with reference to FIG. 3.

After confirming the setting of the picture frame mode or the drive guide mode, the control unit 120 confirms the setting of the combination mode stored in the mode-based setting storage 147 (step S421).

As an example, in case the setting of the combination mode confirmed in step S421 is to restrict some functions of the drive guide mode, the control unit 120 performs a filtering step (step S423) for selecting only essential drive guide information among the various kinds of drive guide information acquired in the drive guide mode, based on the setting of the combination mode. In other words, the information of relatively high importance among the drive guide information is selectively filtered and provided in the combination mode, although the entire drive guide information is provided in the drive guide mode.

Furthermore, the control unit 120 extracts an image from the picture frame image storage 145 based on the background image setting stored in the mode-based setting storage 147. The control unit 120 provides the extracted image to the image processing unit 151 and also provides the drive guide information extracted through the filtering in step S423 to the image processing unit 151.

Then, the image processing unit 151 provides the image extracted from the picture frame image storage 145 as the background image on the screen for displaying the drive guide information, while simultaneously displaying the drive guide information selected in step S423 over the background image (step S425).

Accordingly, the present invention enables a user to acquire drive guide information while providing seeing a picture frame image at the same time, by displaying the picture frame image as a background image of a screen which also displays the drive guide information.

Furthermore, in case a user selects a picture frame function during execution of a drive guide mode for supply of drive guide information, the present invention allows the user to freely select and change a picture frame mode in the midst of the drive guide mode by providing a picture frame image as a background image of a drive guide image according to a pre-set picture frame mode.

Moreover, in case a user selects a guide function during execution of a picture frame mode under a picture frame function, the present invention allows the user to freely select and change guide modes in the midst of the picture frame mode by additionally providing a drive guide image over a picture frame image according to a pre-set drive guide mode. In particular, only the information of relatively high importance is provided through filtering, when the guide function is selected during execution of the picture frame function. This helps to reduce a data loading time and to rapidly provide a user with the drive guide information.

The present invention also provides an advantageous in that different user's desires may be performed by allowing a user to enjoy seeing a picture frame image many different ways during execution of a picture frame mode under a picture frame function.

While the invention has been shown and described with respect to the preferred embodiments, it will be understood by those skilled in the art that various changes and modification may be made without departing from the scope of the invention as defined in the following claims.

What is claimed is:

1. A navigation apparatus comprising:
   an input unit for allowing a user to select one of a drive guide mode for realization of a drive guide function, a picture frame mode for realization of a picture frame function and a combination mode for simultaneous realization of the guide function and the picture frame function;
   a map data storage for storing map data for use in the drive guide mode;
   a picture frame image storage for storing one or more images;

a mode-based setting storage for storing mode-based settings required in operating the navigation apparatus in the drive guide mode, the picture frame mode or the combination mode; and a control unit for, based on the mode-based settings stored through the input unit, providing drive guide information by using the map data in the drive guide mode, providing a picture frame image by using the images in the picture frame mode and providing the picture frame image and the drive guide information in the combination mode, the drive guide information being displayed over the picture frame image.

2. The navigation apparatus of claim 1, wherein the control unit is adapted to provide the picture frame image as the background image for indicating the drive guide information over the background image, if the picture frame function is selected during execution of the drive guide mode.

3. The navigation apparatus of claim 1, wherein the control unit is adapted to provide the picture frame image as the background image for indicating the drive guide information over the background image, if the drive guide function is selected during execution of the picture frame mode.

4. The navigation apparatus of claim 1, wherein the control unit is adapted to filter the drive guide information according to the drive guide mode and provide only essential drive guide information to the user, while providing the picture frame image as the background image for indicating the drive guide information over the background image.

5. The navigation apparatus of claim 2, wherein the control unit is adapted to filter the drive guide information according to the drive guide mode and provide only essential drive guide information to the user, while providing the picture frame image as the background image for indicating the drive guide information over the background image.

6. The navigation apparatus of claim 3, wherein the control unit is adapted to filter the drive guide information according to the drive guide mode and provide only essential drive guide information to the user, while providing the picture frame image as the background image for indicating the drive guide information over the background image.

7. A navigation apparatus operating method, comprising the steps of:

(a) selecting one mode among a drive guide mode for realization of drive guide function, a picture frame mode for realization of a picture frame function and a combination mode for simultaneous realization of the drive guide mode and the picture frame mode;

(b) confirming mode-based settings pre-stored to operate the navigation apparatus in the drive guide mode, the picture frame mode or the combination mode; and (c) based on the mode-based settings corresponding to the respective modes selected in the step (a), providing drive guide information by using map data in the drive guide mode, providing a picture frame image by using the images in the picture frame mode and providing the picture frame image and the drive guide information in the combination mode, the drive guide information being displayed over the picture frame image.

8. The navigation apparatus operating method of claim 7, further comprising the step of: (d) providing the picture frame image as the background image for indicating the drive guide information over the background image, if it is determined in the step (a) that the picture frame function is selected during execution of the drive guide mode.

9. The navigation apparatus operating method of claim 7, further comprising the step of: (e) providing the picture frame image as the background image for indicating the drive guide information over the background image, if it is determined in the step (a) that the drive guide function is selected during execution of the picture frame mode.

10. The navigation apparatus operating method of claim 7, wherein the drive guide information according to the drive guide mode is filtered to provide only essential drive guide information to a user, while providing the picture frame image as the background image for indicating the drive guide information on the background image.

11. The navigation apparatus operating method of claim 8, wherein the drive guide information according to the drive guide mode is filtered to provide only essential drive guide information to a user, while providing the picture frame image as the background image for indicating the drive guide information on the background image.

12. The navigation apparatus operating method of claim 9, wherein the drive guide information according to the drive guide mode is filtered to provide only essential drive guide information to a user, while providing the picture frame image as the background image for indicating the drive guide information on the background image.

13. The navigation apparatus operating method of claim 7, wherein the mode-based settings include a background image setting, and wherein the picture frame image is provided as the background image in the step (c) according to the background image setting, if it is determined in the step (a) that the picture frame mode or the combination mode is selected.

14. The navigation apparatus operating method of claim 13, wherein the mode-based settings include an automatic scroll setting and an image switching setting, and wherein the step (c) includes the steps of:

counting a display time of the picture frame image currently displayed as the background image, if it is confirmed that the automatic scroll setting is selected;

determining whether the display time thus counted satisfies the image switching setting; and switching the currently displayed background image image to a next order picture frame image according to the background image setting, if the display time satisfies the image switching setting while performing the automatic scroll setting.

15. The navigation apparatus operating method of claim 14, wherein the automatic scroll setting includes a horizontal scroll method and a vertical scroll method, and wherein the image is changed and displayed according to the scroll method selected.

* * * * *